United States Patent
Lee et al.

(10) Patent No.: US 10,182,080 B2
(45) Date of Patent: Jan. 15, 2019

(54) APPARATUS AND METHOD FOR INTERWORKING BETWEEN WIRELESS NETWORK AND WIRELINE NETWORK

(75) Inventors: Shi-Jae Lee, Suwon-si (KR); Joon-Ho Jung, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1555 days.

(21) Appl. No.: 12/742,608

(22) PCT Filed: Dec. 29, 2008

(86) PCT No.: PCT/KR2008/007741
§ 371 (c)(1),
(2), (4) Date: May 12, 2010

(87) PCT Pub. No.: WO2009/084890
PCT Pub. Date: Jul. 9, 2009

(65) Prior Publication Data
US 2010/0260125 A1    Oct. 14, 2010

(30) Foreign Application Priority Data

Jan. 3, 2008  (KR) .................. 10-2008-0000652

(51) Int. Cl.
*H04L 29/06*  (2006.01)

(52) U.S. Cl.
CPC ...... *H04L 65/1069* (2013.01); *H04L 65/1016* (2013.01)

(58) Field of Classification Search
CPC ... H04W 76/02; H04W 76/021; H04W 80/04; H04W 76/023; H04L 29/0619;
(Continued)

(56) References Cited

U.S. PATENT DOCUMENTS

| | | | |
|---|---|---|---|
| 2002/0101860 A1* | 8/2002 | Thornton | H04L 12/14 370/352 |
| 2004/0095958 A1* | 5/2004 | Ejzak | H04W 88/181 370/465 |

(Continued)

FOREIGN PATENT DOCUMENTS

| | | |
|---|---|---|
| KR | 1020040073391 | 8/2004 |
| KR | 1020060116456 | 11/2006 |
| KR | 1020090049229 | 5/2009 |

OTHER PUBLICATIONS

3GPP TR 29.802 V7.0.0 (Jun. 2007) 3rd Generation Partnership Project; Technical Specification Group Core Network and Terminals; (G) MSC-S-(G)MSC-S NC Interface . . . (69 pages).

(Continued)

*Primary Examiner* — Andrew W Chriss
*Assistant Examiner* — Kenan Cehic
(74) *Attorney, Agent, or Firm* — The Farrell Law Firm, P.C.

(57) ABSTRACT

An interworking of a wireless network and a wireline network is provided. A call setup method of a network apparatus in an IP Multimedia Subsystem (IMS) network includes setting a call between a first terminal of a first IMS network and a second terminal of a second IMS network; determining whether a protocol conversion is needed between the first terminal and the second terminal in the setting operation; and performing the protocol conversion when the protocol conversion is needed.

16 Claims, 15 Drawing Sheets

(58) Field of Classification Search
CPC ......... H04L 29/06197; H04L 29/06217; H04L 29/06319; H04L 29/06326
USPC ............ 370/310–350, 259, 260–269, 395.5, 370/395.6, 465–467
See application file for complete search history.

(56) References Cited

U.S. PATENT DOCUMENTS

| | | | |
|---|---|---|---|
| 2004/0240399 A1* | 12/2004 | Corrao | H04L 29/06 370/260 |
| 2006/0256748 A1 | 11/2006 | Jung et al. | |
| 2006/0268900 A1 | 11/2006 | Larsson et al. | |
| 2007/0121608 A1* | 5/2007 | Gu | H04L 12/6418 370/356 |
| 2008/0112395 A1* | 5/2008 | Zhu et al. | 370/352 |
| 2008/0270618 A1* | 10/2008 | Rosenberg | H04L 65/1069 709/228 |
| 2009/0190603 A1* | 7/2009 | Damola | H04L 29/06217 370/401 |
| 2010/0191829 A1* | 7/2010 | Cagenius | H04L 12/2834 709/219 |
| 2010/0309906 A1* | 12/2010 | Ramachandran | H04L 12/6418 370/352 |

OTHER PUBLICATIONS

Written Opinion of the Int'l Searching Authority (Form PCT/ISA/237) (5pages).

* cited by examiner

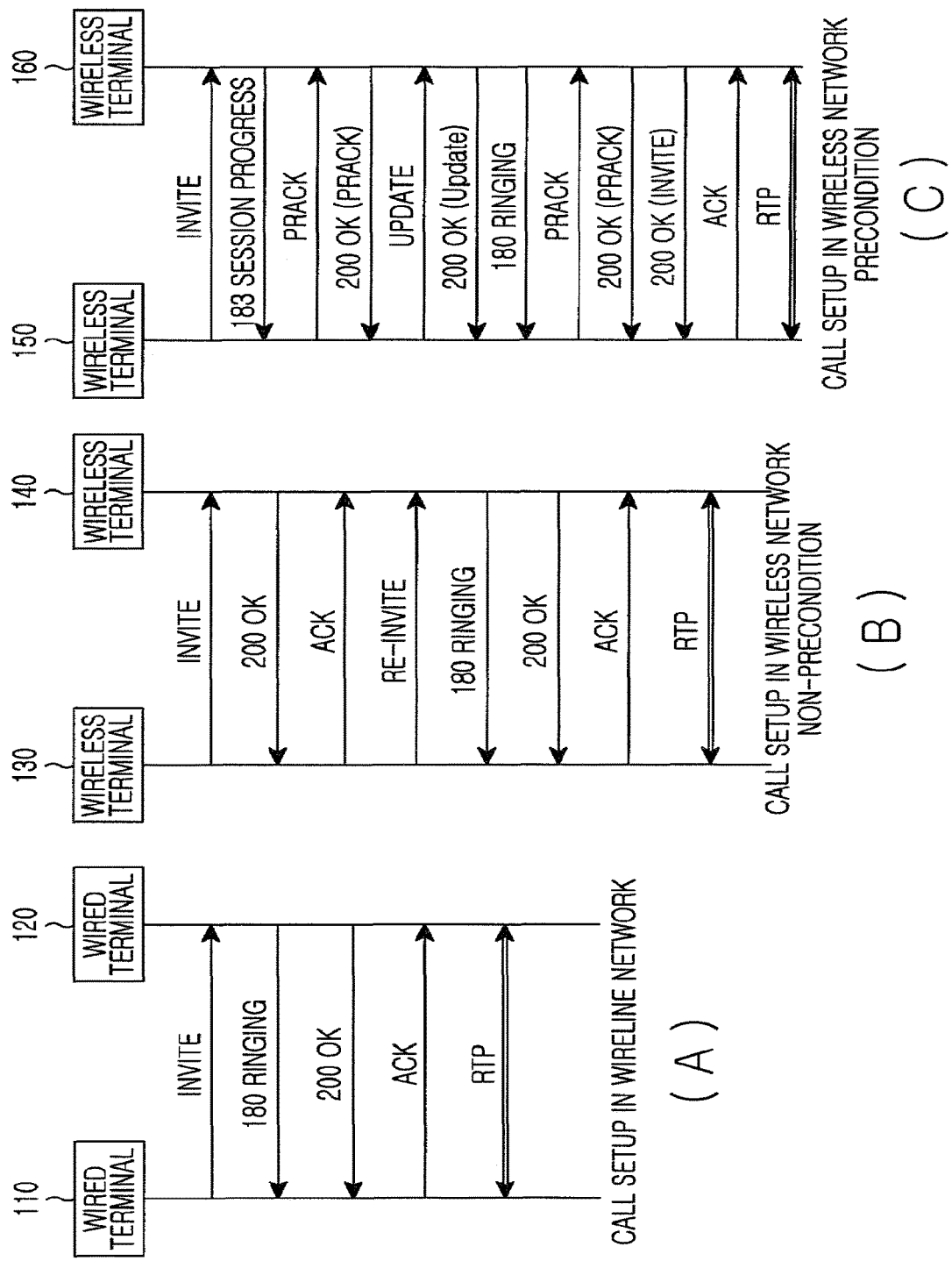
[Fig. 1]

[Fig. 2]
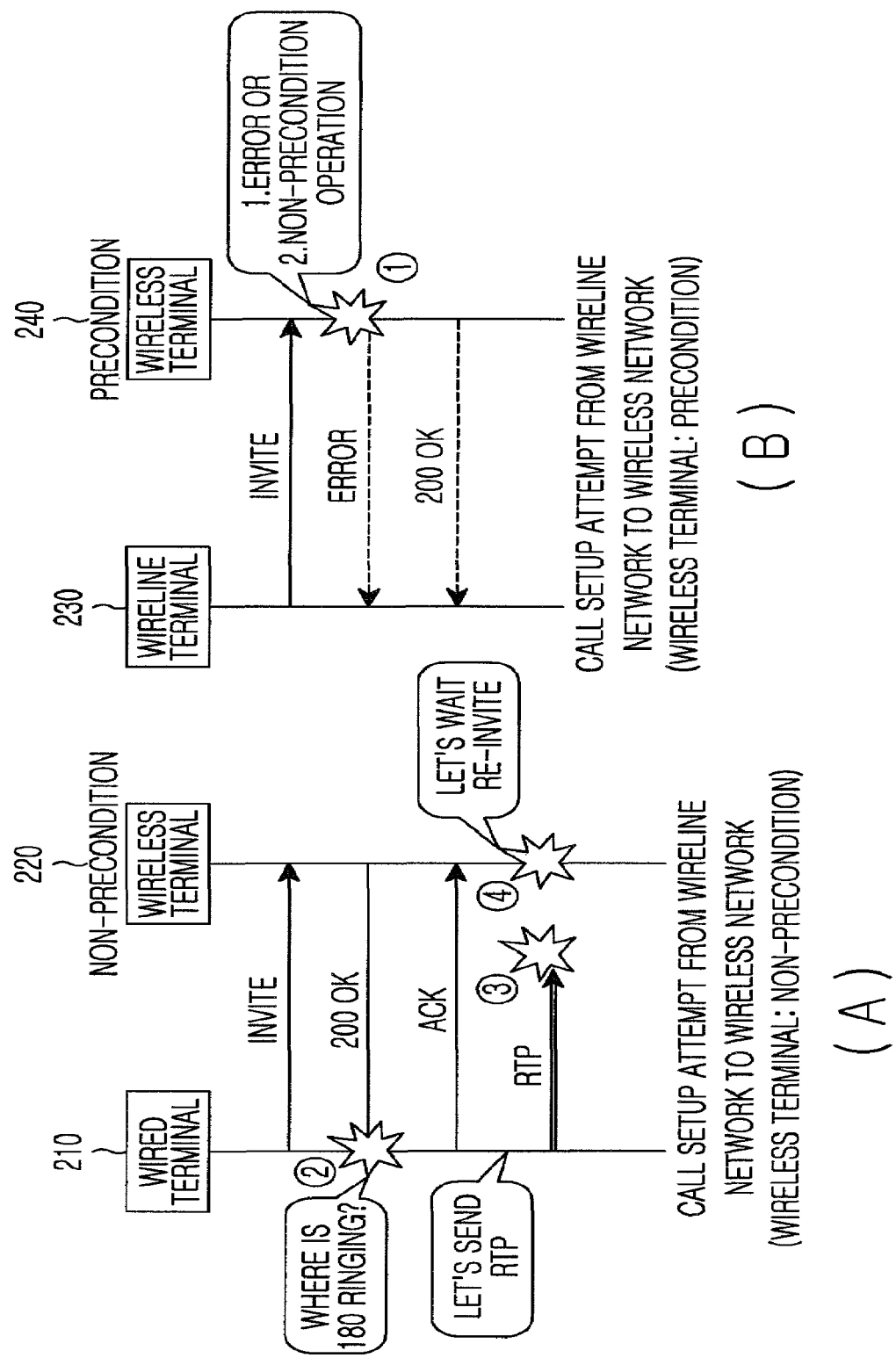

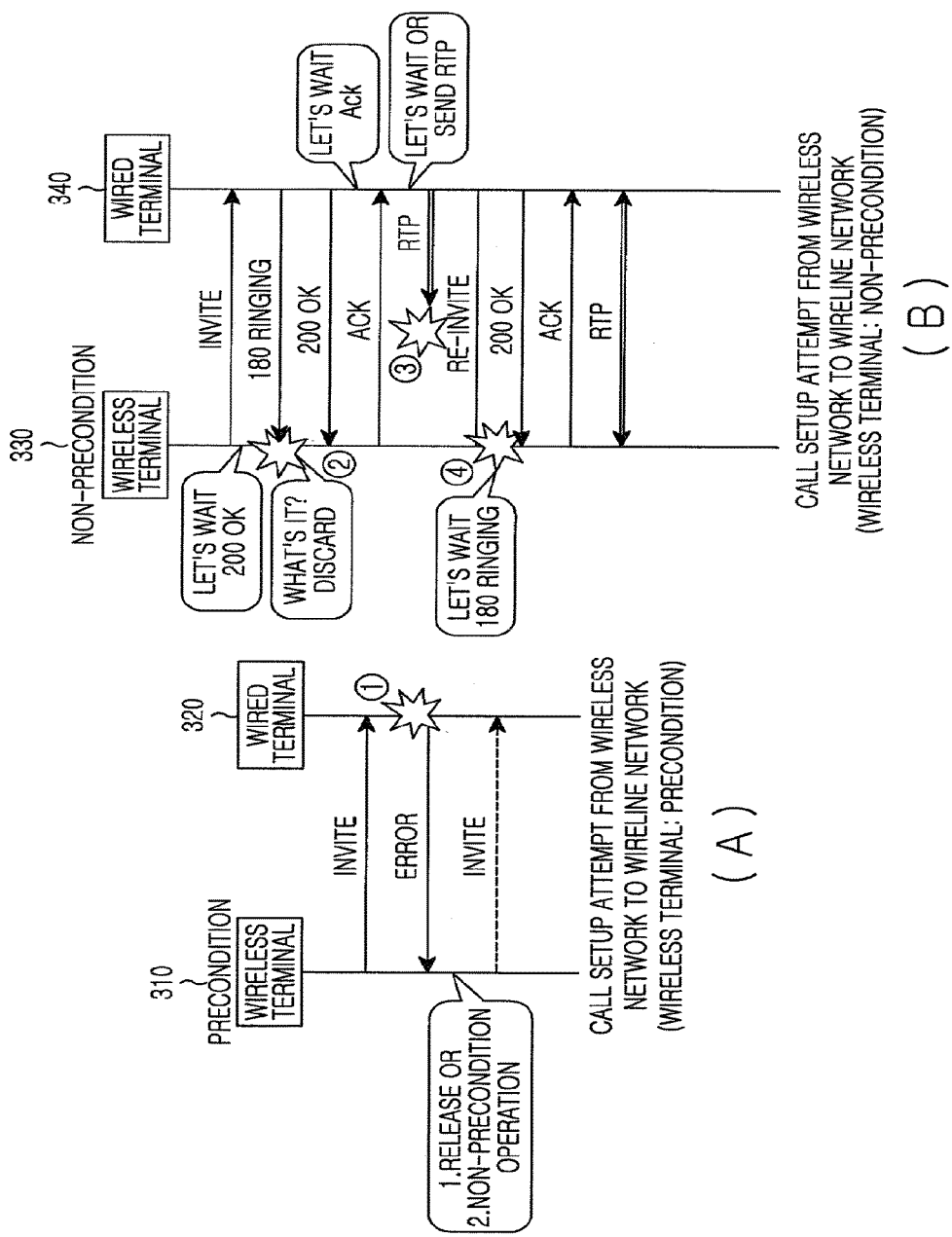
[Fig. 3]

[Fig. 4]
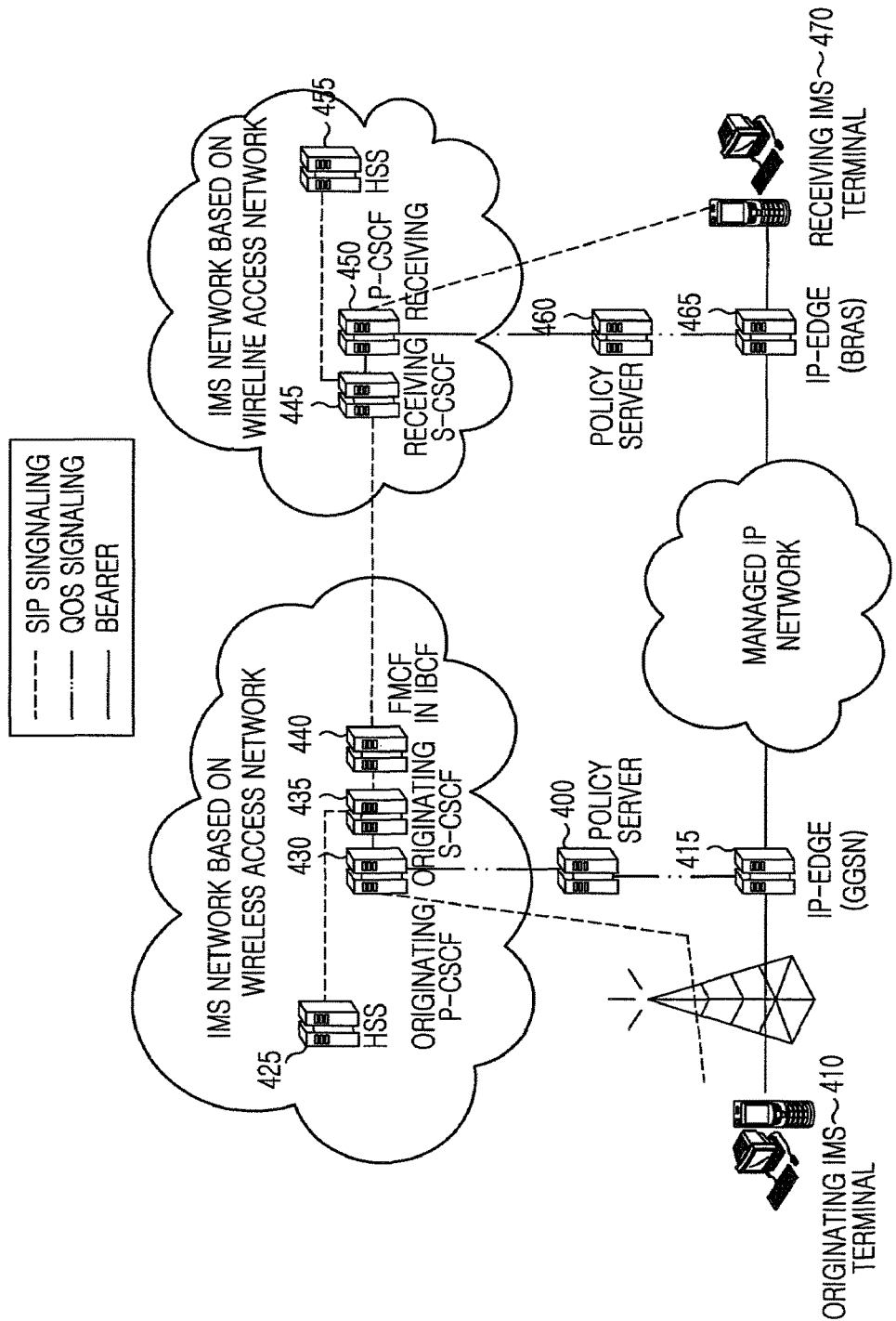

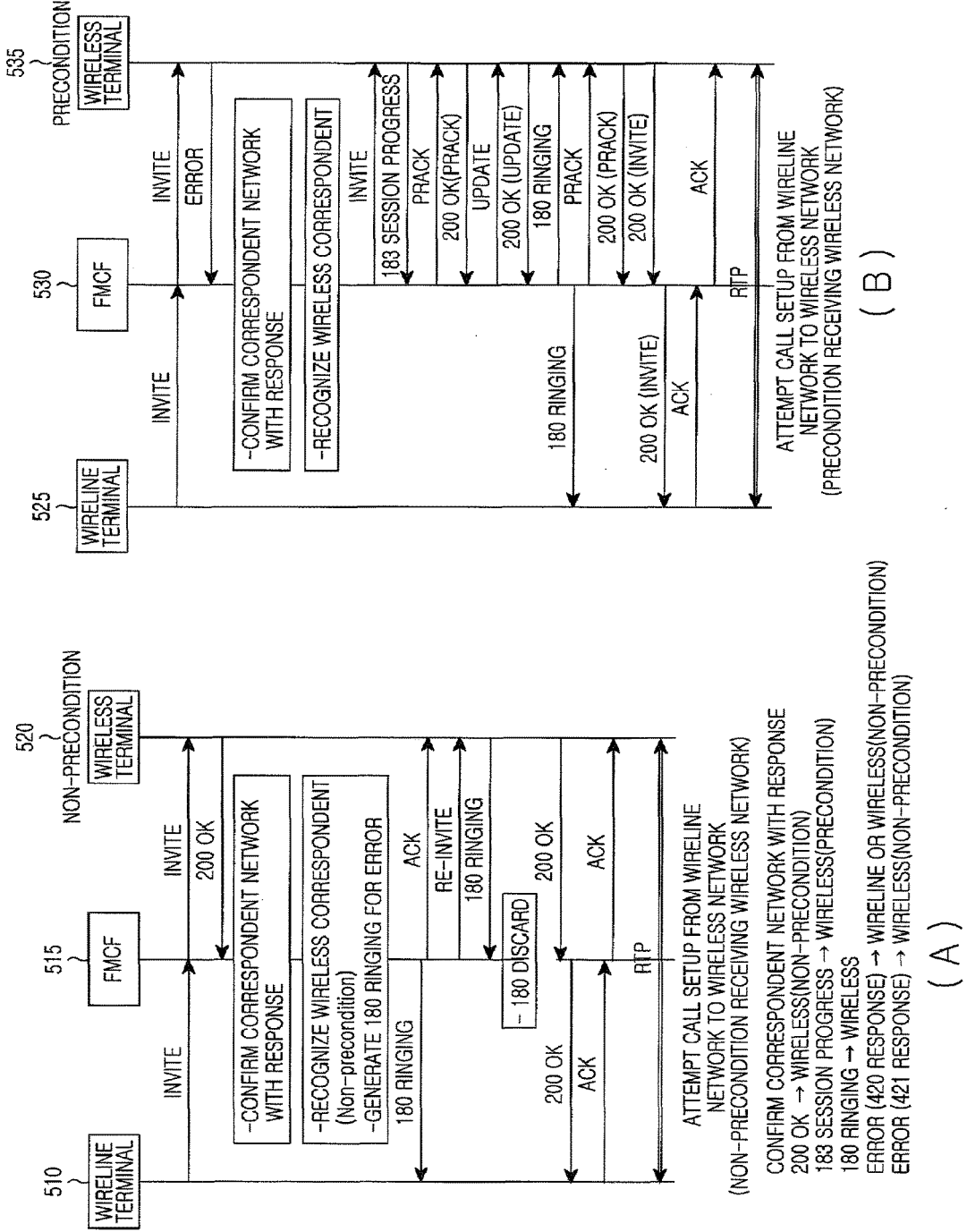

[Fig. 6]
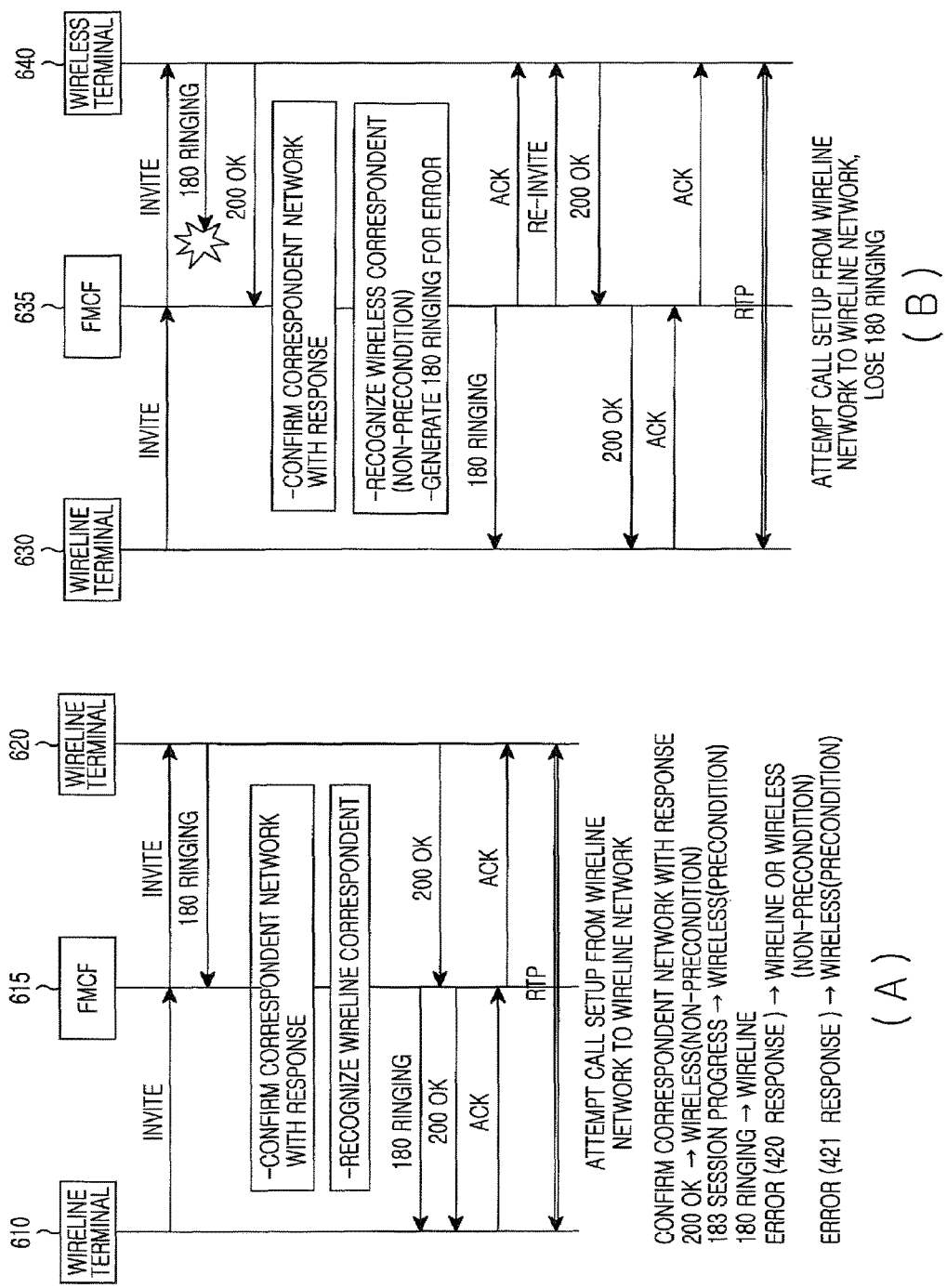

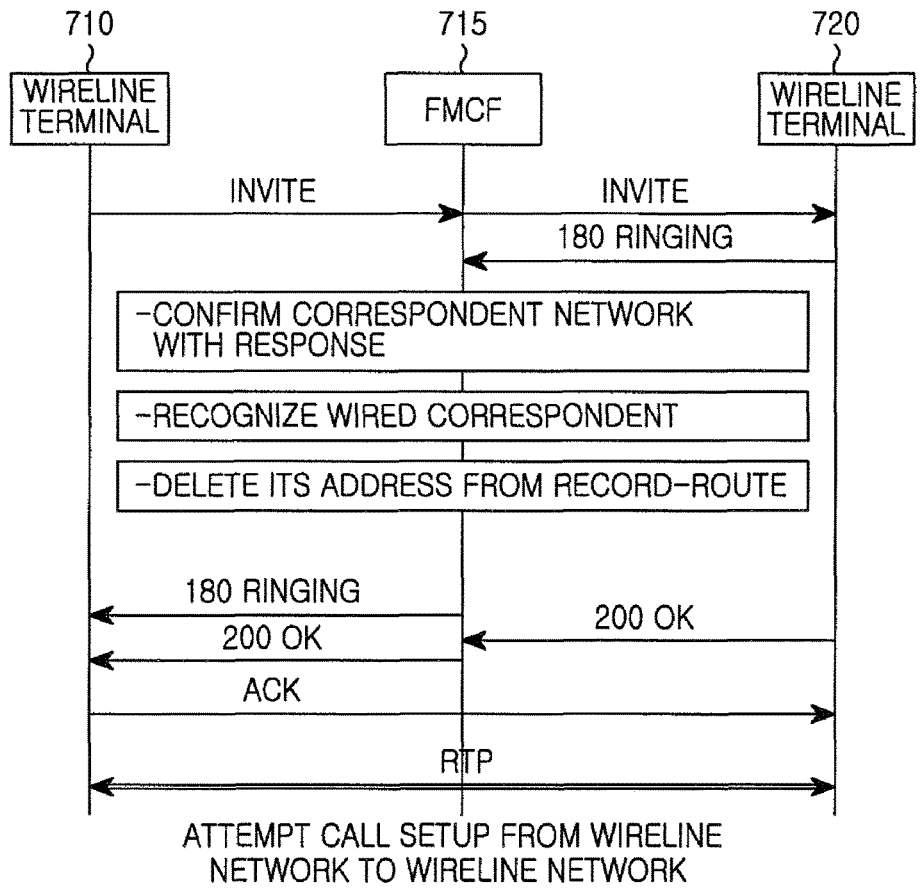
[Fig. 7]
ATTEMPT CALL SETUP FROM WIRELINE
NETWORK TO WIRELINE NETWORK
CONFIRM CORRESPONDENT NETWORK WITH RESPONSE
200 OK → WIRELESS(NON-PRECONDITION)
183 SESSION PROGRESS → WIRELESS(PRECONDITION)
180 RINGING → WIRELINE
ERROR (420 RESPONSE) → WIRELINE OR WIRELESS(NON-PRECONDITION)
ERROR (421 RESPONSE) → WIRELESS(PRECONDITION)

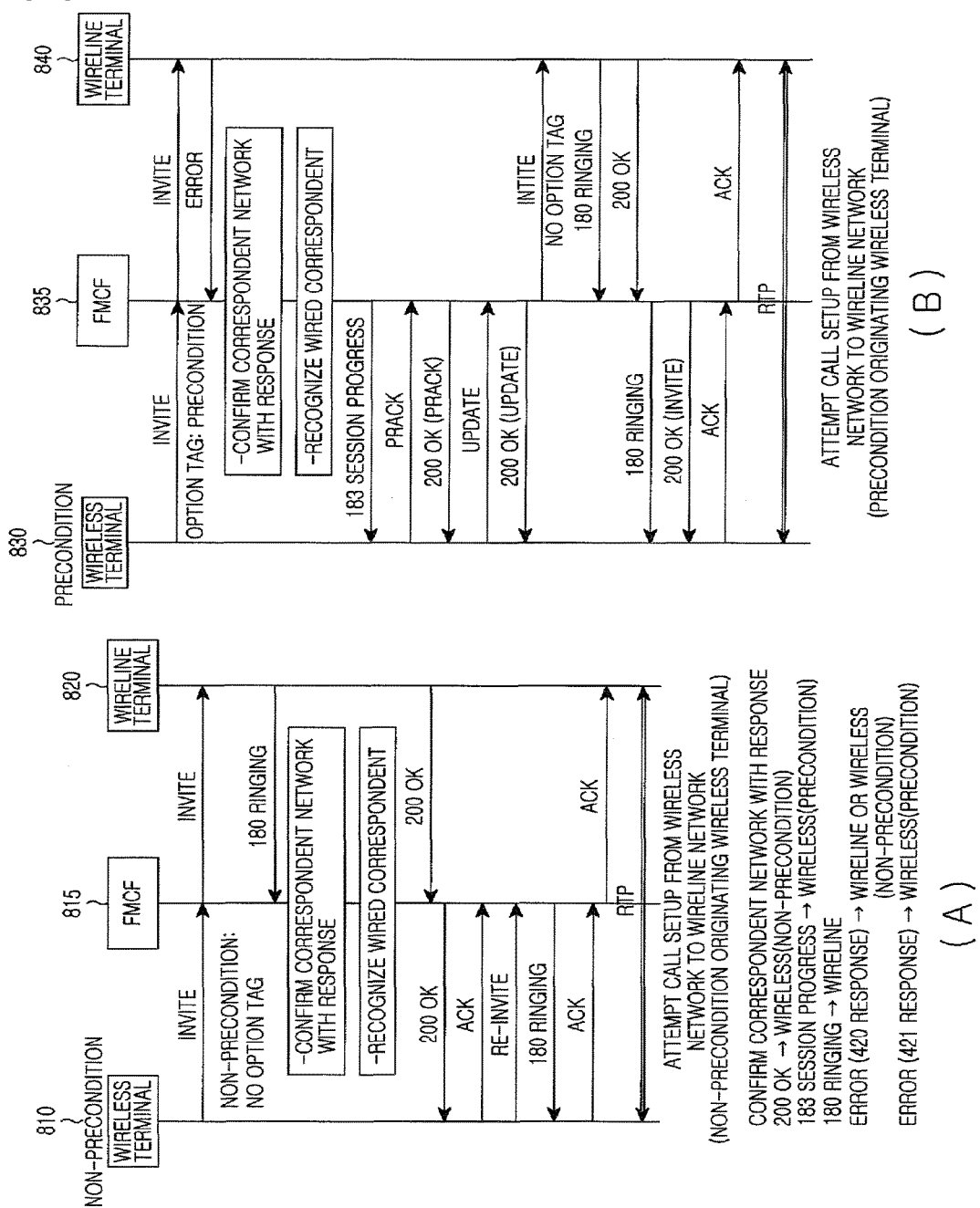

[Fig. 9]
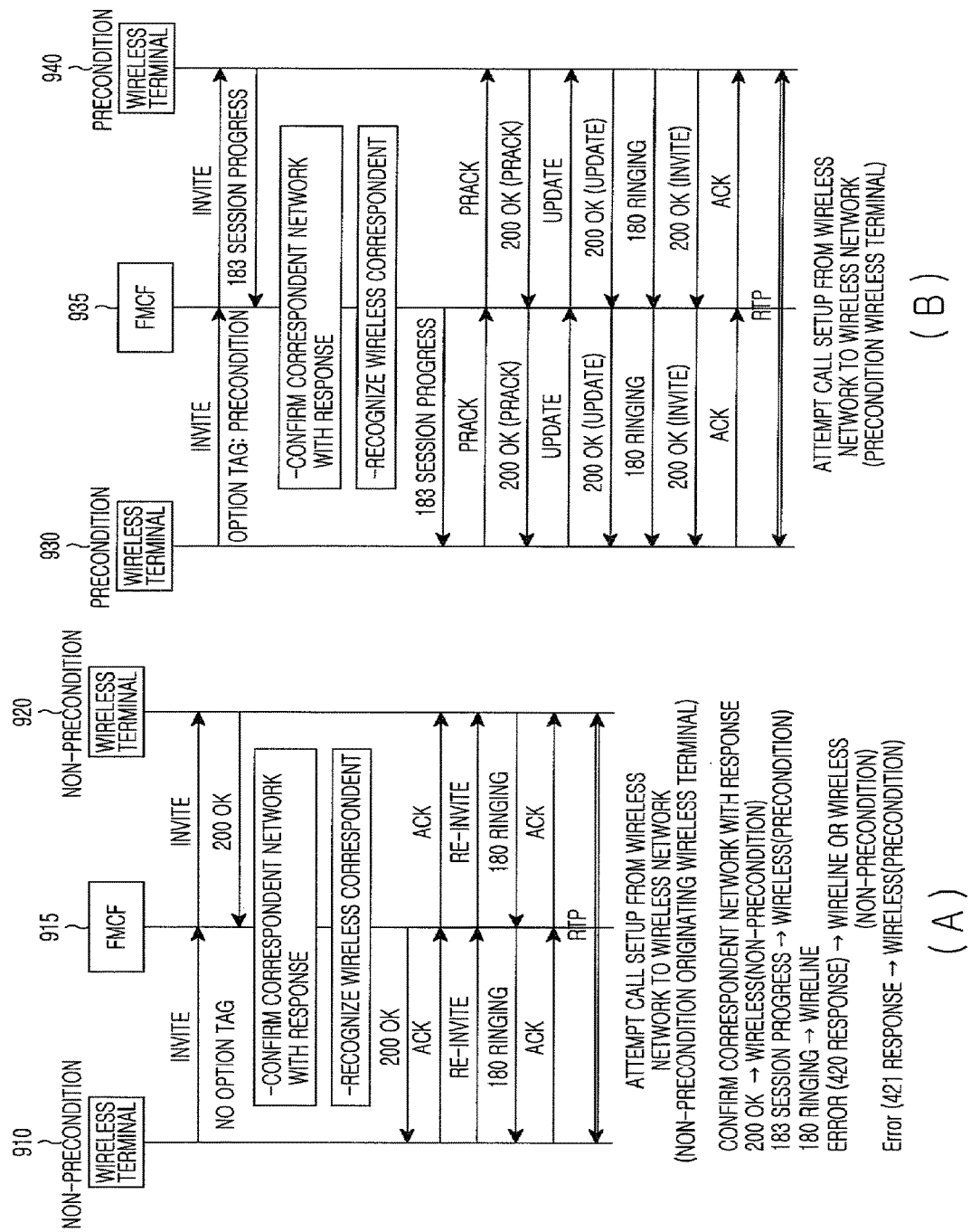

[Fig. 10]
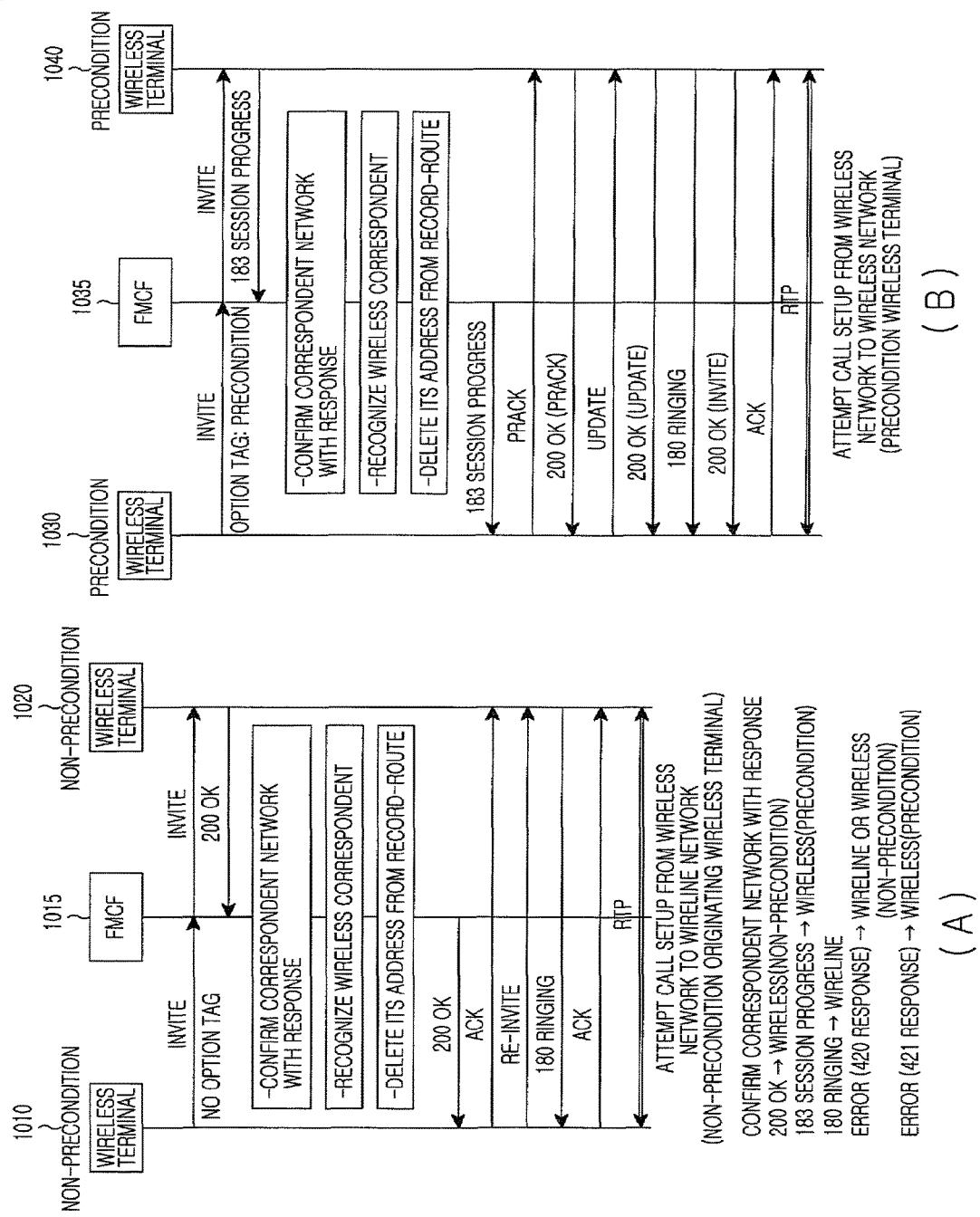

[Fig. 11]
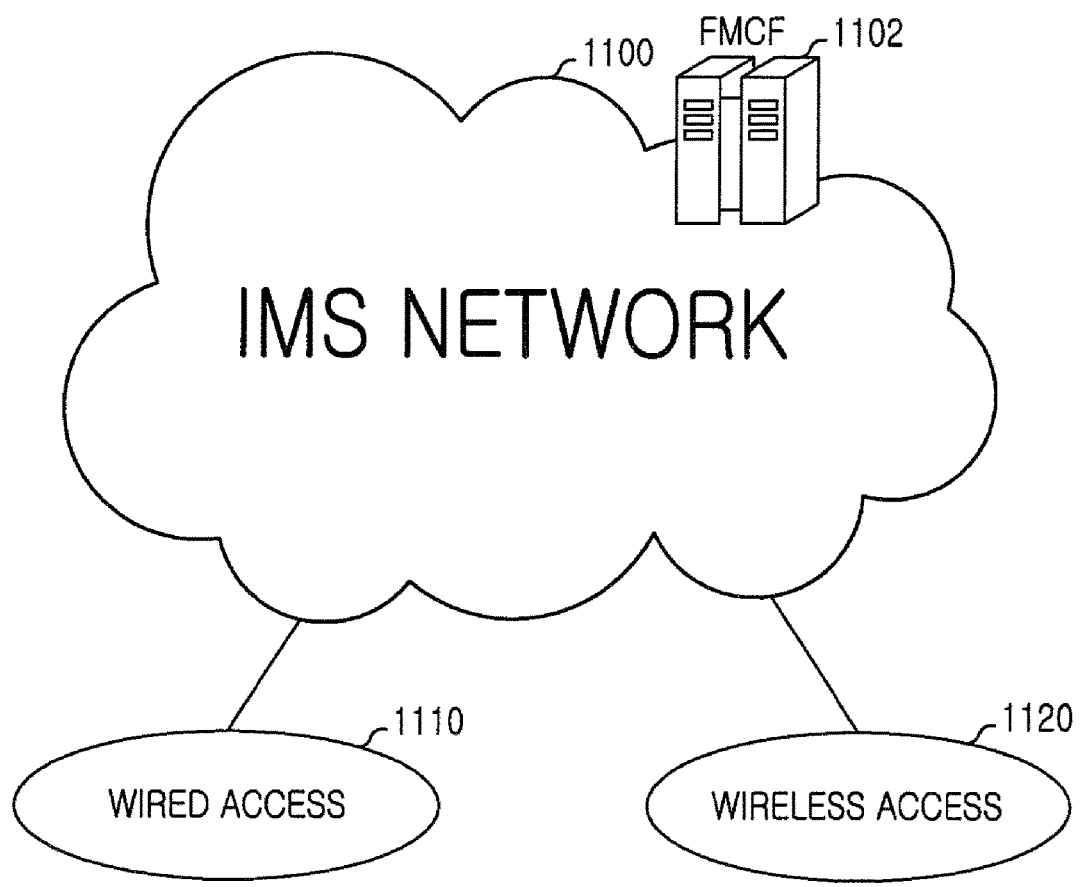

[Fig. 12]
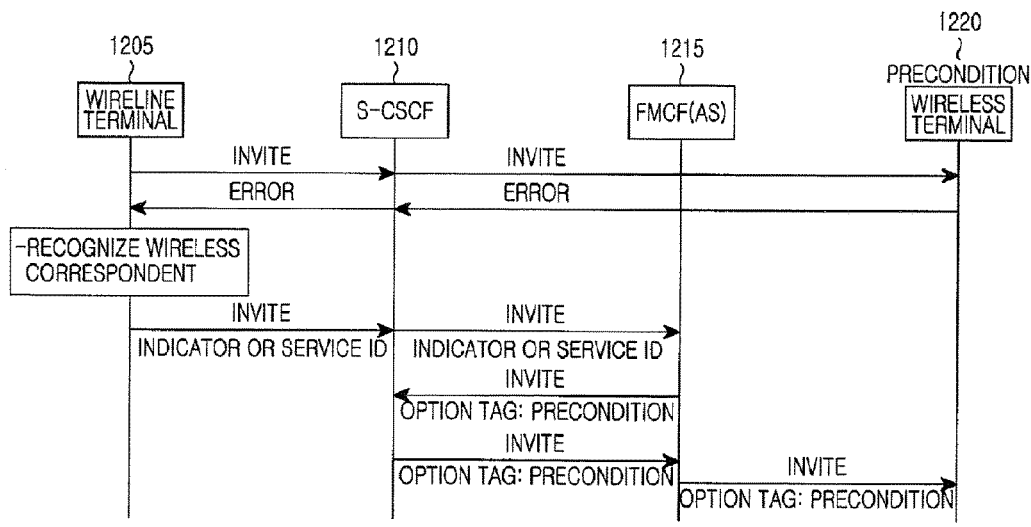
(A)
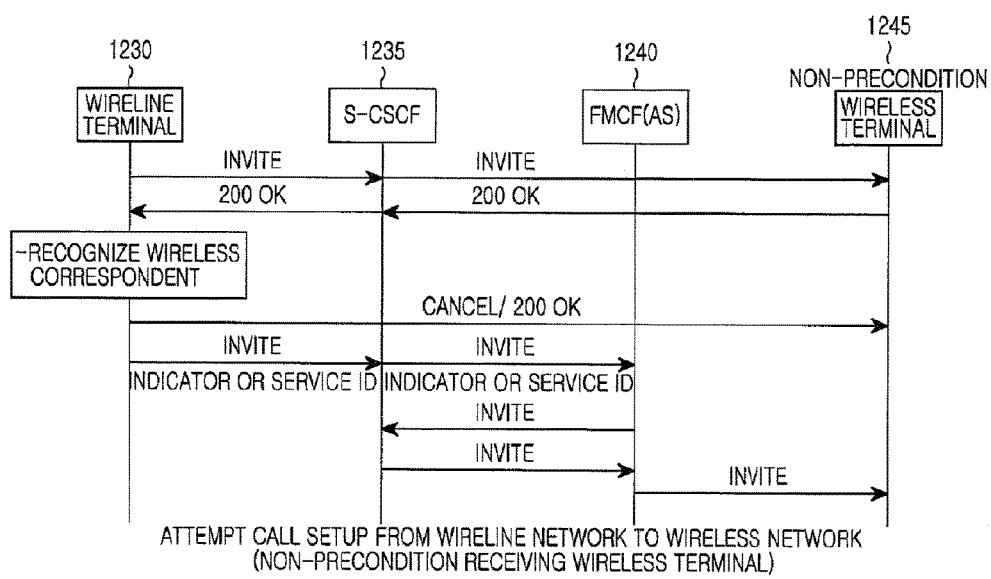
(B)

[Fig. 13]

| SERVICE ID | RESPONSE | CORRESPONDENT NETWORK |
|---|---|---|
| +G.IMS.ICSI.FMCF.SRV_1 | 200 OK | WIRELESS(NON-PRECONDITION) |
| +G.IMS.ICSI.FMCF.SRV_2 | 183 SESSION PROGRESS | WIRELESS(PRECONDITION) |
| +G.IMS.ICSI.FMCF.SRV_3 | 180 RINGING | WIRELINE |
| +G.IMS.ICSI.FMCF.SRV_4 | ERROR (420 RESPONSE) | WIRELINE OR WIRELESS(NON-PRECONDITION) |
| +G.IMS.ICSI.FMCF.SRV_5 | ERROR (421 RESPONSE) | WIRELESS(PRECONDITION) |

[Fig. 14]
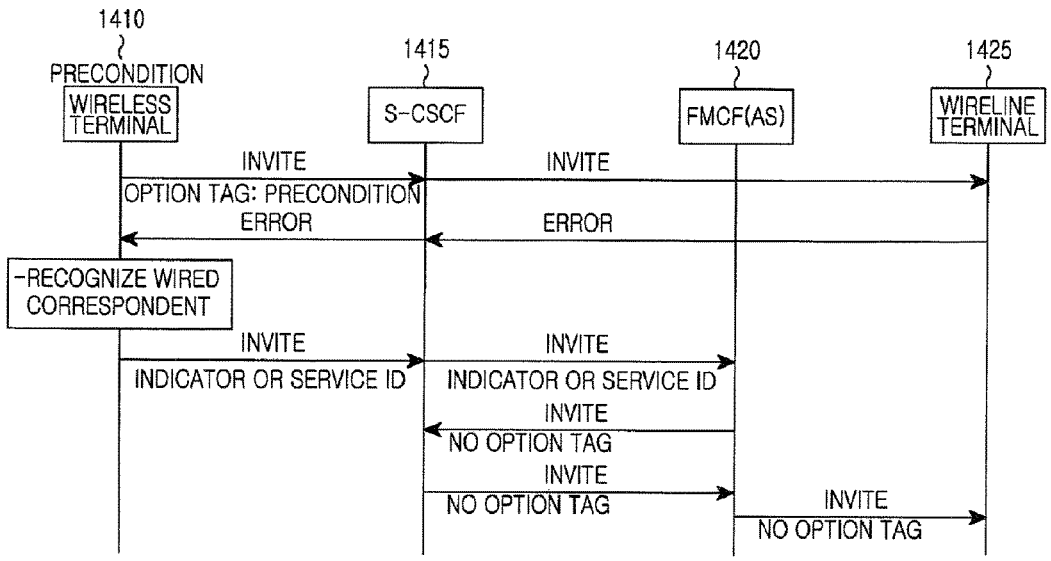
(A)
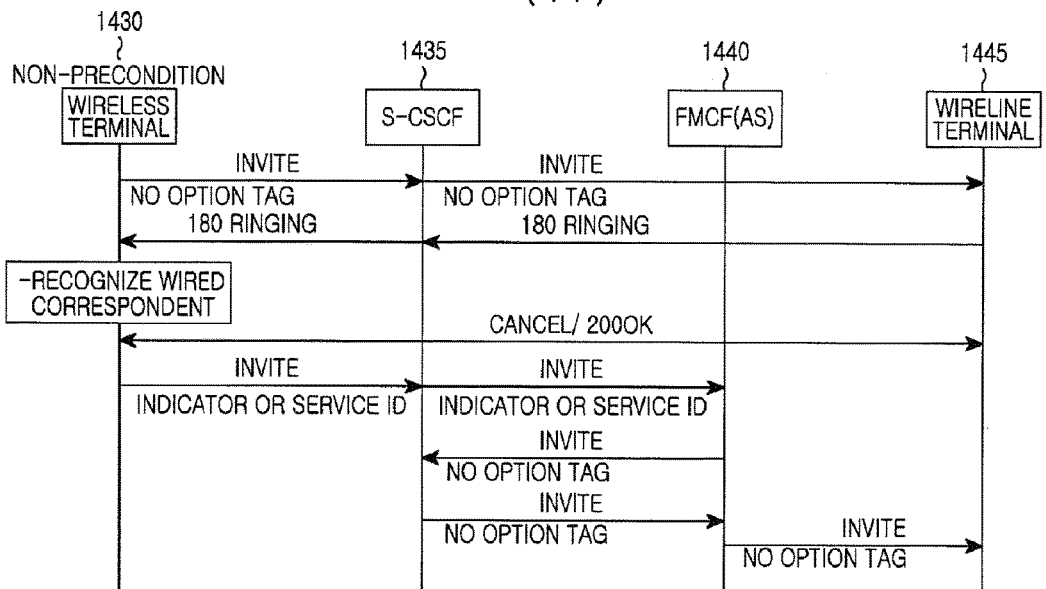
(B)

[Fig. 15]
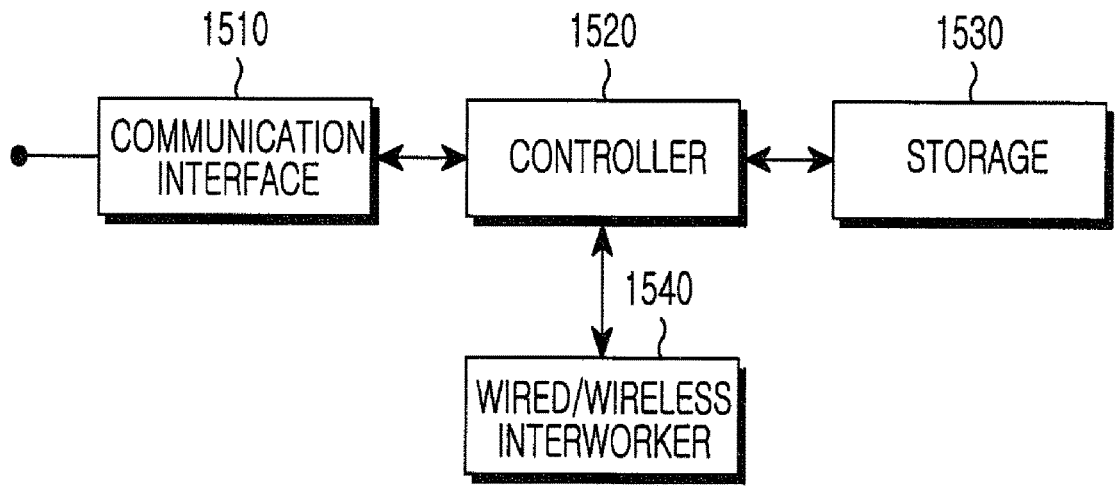
[Fig. 16]
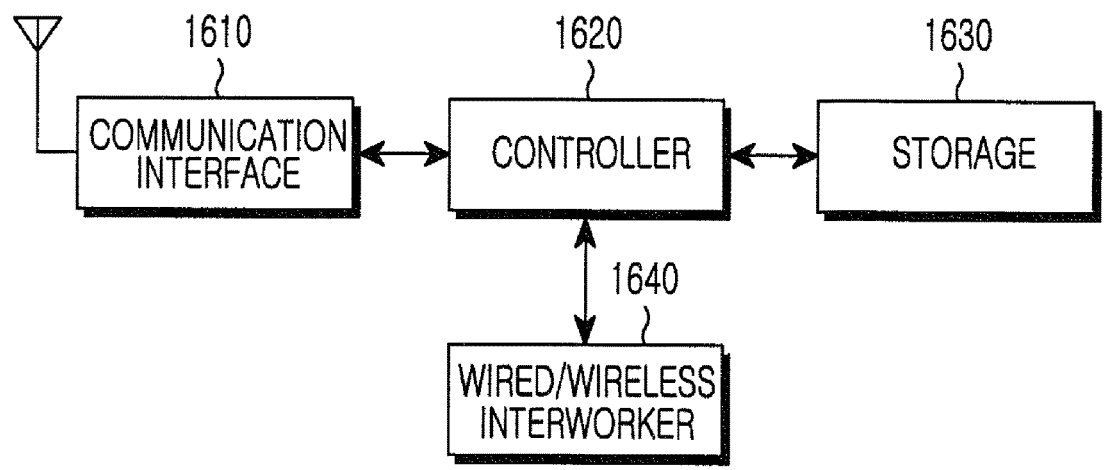

APPARATUS AND METHOD FOR INTERWORKING BETWEEN WIRELESS NETWORK AND WIRELINE NETWORK

TECHNICAL FIELD

The present invention relates to an apparatus and a method for completing a resource allocation prior to a call setup without affecting an existing system in communications, in wireline and wireless networks which define different resource reservation procedures.

BACKGROUND ART

In a network using Internet Protocol (IP) transport, IP Multimedia Subsystem (IMS) is regarded as a basic infrastructure for delivering various multimedia services. The $3^{rd}$ Generation Partnership Project (3GPP)/3GPP2 standards define the IMS, and the TISPAN (Telecoms & Internet converged Services & Protocols for Advanced Networks) standard defines the fixed network IMS.

Those standards suggest resource reservation procedures in accordance with characteristics of an access network. The 3GPP IMS defines the resource reservation procedure including two options of a precondition and a non-precondition.

The precondition option allocates the resources for communications prior to the call setup through one INVITE request transmission, and the non-precondition option allocates the resources for the call setup through two INVITE request transmissions.

The 3GPP standard defines a call flow based on the precondition to complete the resource reservation prior to the session activation and recently defines the non-precondition based call flow based without applying the precondition (for services not requiring real-time QoS). However, since the concept of the precondition is absent in the wireline network, the precondition is not requested in the call setup.

To allow the call setup between a wireless terminal and a wired terminal, when the wireless terminal also provides the call setup using the non-precondition call flow without applying the precondition, it seems that the smooth call setup is carried out between the wireline network and the wireless network. However, in this situation, the call setup is impossible because of the difference of the call flows of the two networks. When the non-precondition is adopted, due to the characteristic of the wireless network which reserves the wireless resource, the terminal attempting voice communications needs to send the INVITE request two times.

In the wireless network, what is needed is a method for reserving the resource of the wireless network by transmitting one INVITE request and activating the reserved resource by sending the re-INVITE request after the reservation so that the terminal can use the reserved resource.

The wireline network conducts the reservation and the permission of the wired resource by means of one INVITE request transmission. The non-precondition call flow defined by the 3GPP aims to provide flexibility against the absence of the pre-condition, but does not consider the interworking with the wireline network. Hence, the call setup varies in FIGS. 1 A, B and C. Naturally, the smooth call setup between the wired terminal and the wireless terminal is not expected.

FIG. 1A shows the call setup procedure in the wireline network, FIG. 1B shows the call setup procedure (the non-precondition) in the wireless network, and FIG. 1C shows the call setup procedure (the precondition) in the wireless network.

When the wireless terminal adopting the precondition attempts the call setup to the wired terminal, the wired terminal not adopting the precondition is likely to respond with error. Upon confirming the error, the wireless terminal may attempt the call setup by applying the non-precondition, if the non-precondition is supported. In the end, the call setup fails between the wireless terminal and the wired terminal because of the difference of the call flows of the wireline and wireless networks as shown in FIGS. 1 A, B and C.

Since the wireline network does not need to separate the resource reservation and the resource permission as in the wireless network, merely the single INVITE request transmission enables the communications. By contrast, while the wireless network requires two INVITE request transmissions in the non-precondition and requires one INVITE request transmission in the precondition, an UPDATE message transmission is needed in addition.

This difference causes out-of-service due to signaling state mismatch when the wireless network attempts the call to the wireline network or the wireline network attempts the call to the wireless network.

FIGS. 2 A and B depicts the call setup failure because of the signaling mismatch when the wireline network attempts the call setup to the wireless network.

In FIG. 2A, a wireline terminal 210 receives 200 Ok response at the point of receiving 180 Ringing response. While the wireline terminal 210 expects the 180 Ringing response from a wireless terminal 220 after sending the INVITE request, the wireline terminal 210 receives 200 Ok response (step 2: the wireline terminal 210 receives 200 Ok response at the point of receiving the 180 Ringing response).

The wireline terminal 210 may terminate the call setup procedure by regarding the response as error, or ignore the 180 Ring response and normally process the 200 Ok message.

In case where the wireline terminal 210 normally processes the 200 Ok response, the wireline terminal 210 sends Ack response and is ready to transmit a Realtime Transfer Protocol (RTP).

When the wireline terminal 210 sends the RTP, the RTP is discarded over the network because the wireless network and the wireless terminal have no the resource activation. That is, the wireline terminal 210 fails the RTP transmission (step 3: RTP transmission fails).

After receiving the Ack response from the wireline terminal 210, the wireless terminal 220 (non-precondition) expects the re-INVITE request from the wireline terminal 210 and enters a waiting mode without performing further operations.

Ultimately, the wireline terminal 210 and the wireless terminal 220 both stay in the waiting mode and fail the call setup because a timer expires (step 4: keep stand-by).

Referring to FIG. 2B, a wireless terminal 240 (the precondition) fundamentally enters the precondition mode. The INVITE request transmitted from an originating terminal (a wireline terminal 230) does not include an option tag precondition. When the correspondent does not support the precondition, the wireless terminal 240 basically transmits an error response.

When the INVITE request does not include the option tag 'Required : Precondition', the wireless terminal 240 may function as the non-precondition terminal and send the 200 Ok response. Even when the wireless terminal 240 operates as the non-precondition terminal, the call setup finally fails because of the above-mentioned problems (the steps 1, 2, and 3).

FIGS. 3 A and B illustrates the call setup failure resulted by the signaling mismatch in attempting the call setup from the wireless network to the wireline network.

In FIG. 3A, even when the INVITE request sent from an originating terminal 310 contains the option tag 'Required : Precondition', a wired terminal 320 cannot know the precondition (step 1).

Since the concept of the precondition is absent in the wireline network, the wired terminal 320 is unsupported and transmits the error response. Receiving the error response, the wireless terminal 310 may terminate the call setup procedure, or enter the non-precondition mode and retransmit the INVITE request, which results drawbacks in steps 2, 3 and 4 as follows.

In FIG. 3B, a wireless terminal 330 receives 180 Ringing response while expecting 200 Ok response. The wireless terminal 330 is expecting to receive the 200 Ok response from the correspondent 340 after the INVITE request transmission. On the contrary, the correspondent 340 sends the 180 Ringing response.

Upon receiving the 180 Ringing response, the wireless terminal 330 recognizes as error and terminates the call setup procedure. In this case, the call setup fails (step 2: the wireless terminal receives the 180 Ringing response while expecting to receive the 200 Ok response).

In step 2, the RTP transmission is feasible after the Ack response transmission in the communications between the wireline networks. Accordingly, the wired terminal 340, receiving the Ack response from the wireless terminal 330, is able to send the RTP and thus transmits the RTP first or waits for the RTP from the correspondent 330.

In so doing, since the wired terminal 340 does not acquire the bearer resource in the wireless network, the RTP will be dropped in the network and the wired terminal 340 enters the standby mode in the end.

However, because the wireless terminal 330 transmits the re-INVITE request, it is not likely that the call setup procedure is terminated (step 3 in case of stand-by or RTP transmission).

After the re-INVITE request transmission, the wireless terminal 330 expects to receive 180 Ringing response from the wired terminal 340. But, since the wired terminal 330 sent the 180 Ringing response in the first INVITE reception, it sends the 200 Ok response without no more 180 Ringing response.

When the wireless terminal 340 recognizes as error and ends the call setup procedure, the call setup fails (step 4: the wireless terminal receives the 200 Ok response while expecting the 180 Ringing response).

In FIGS. 2 and 3, the server sends the error response when only one terminal supports the precondition and thus the call setup fails. The error response can vary depending on the implementation of the terminal and a policy of a provider.

In relation to the error in FIGS. 2 and 3, the standard defines 420 Bad Extension response and 421 Extension Required response. The error response of FIGS. 2 A and B corresponds to the 421 Extension Required, and the error response of FIGS. 3 A and B corresponds to the 420 Bad Extension.

As shown in FIGS. 2 and 3, the call setup attempt from the wireline network to the wireless network is definitely infeasible, and the call setup attempt from the wireless network to the wireline network can degrade QoE due to the transmission and omission of the unexpected message in the call setup and the difference of the voice communication start points. What is worse, the call setup may fail. Disadvantageously, the signaling mismatch results the call setup failure.

DISCLOSURE OF INVENTION

Technical Solution

An aspect of the present invention is to address at least the above mentioned problems and/or disadvantages and to provide at least the advantages described below. Accordingly, an aspect of the present invention is to provide an apparatus and a method for interworking between a wireless network and a wireline network.

Another aspect of the present invention is to provide an interworking apparatus and an interworking method for completing a resource allocation prior to a call setup against a signaling mismatch when an IMS terminal attempts a call, regardless of whether a receiving network is wired or wireless.

According to one aspect of the present invention, a call setup method of a network apparatus in an IP Multimedia Subsystem (IMS) network includes setting a call between a first terminal of a first IMS network and a second terminal of a second IMS network; determining whether a protocol conversion is needed between the first terminal and the second terminal in the setting operation; and performing the protocol conversion when the protocol conversion is needed.

According to another aspect of the present invention, a call setup method of a terminal in an IP Multimedia Subsystem (IMS) network includes transmitting a call setup message destined for a receiving terminal, to a junction node; receiving a response message of the call setup message from the junction node; and determining whether a protocol conversion is needed or not by analyzing the response message.

According to yet another aspect of the present invention, a network apparatus for conducting a call setup in an IP Multimedia Subsystem (IMS) network includes a communication interface for communicating with other nodes; and a wired/wireless interworker for setting a call between a first terminal of a first IMS network and a second terminal of a second IMS network through the communication interface, determining whether a protocol conversion is needed between the first terminal and the second terminal in the call setup, and performing the protocol conversion when the protocol conversion is needed.

According to still another aspect of the present invention, a terminal apparatus for setting a call in an IP Multimedia Subsystem (IMS) network includes a communication interface for communicating with other nodes; and an wired/wireless interworker for transmitting a call setup message destined for a receiving terminal, to a junction node, receiving a response message of the call setup message from the junction node, and determining whether a protocol conversion is needed or not by analyzing the response message.

BRIEF DESCRIPTION OF THE DRAWINGS

The above and other aspects, features and advantages of certain exemplary embodiments the present invention will become more apparent from the following detailed description taken in conjunction with the accompanying drawings, in which:

FIGS. 1 A, B and C illustrates a call setup procedure in a wireline network and a call setup procedure in a wireless network;

FIGS. 2 A and B illustrates a call setup failure resulted by a signaling mismatch when the wireline network attempts the call setup to the wireless network;

FIGS. 3 A and B illustrates a call setup failure resulted by the signaling mismatch in attempting the call setup from the wireless network to the wireline network;

FIG. 4 illustrates an interworking structure between wireline and wireless IMS networks according to an exemplary embodiment of the present invention;

FIGS. 5 A and B illustrates a call setup attempt from the wireline network to the wireless network according to an exemplary embodiment of the present invention;

FIGS. 6 A and B illustrates a call setup attempt from the wireline network to the wireline network according to an exemplary embodiment of the present invention;

FIG. 7 illustrates operations when an originating network and a receiving network are the same type networks according to an exemplary embodiment of the present invention;

FIGS. 8 A and B illustrates a call setup attempt from the wireless network to the wireline network according to an exemplary embodiment of the present invention;

FIGS. 9 A and B illustrates operations in a relay mode when the originating network and the receiving network are the same type networks according to an exemplary embodiment of the present invention;

FIGS. 10 A and B illustrates operations of a transparent mode when the originating network and the receiving network are the same type networks according to an exemplary embodiment of the present invention;

FIG. 11 illustrates a structure when an IMS network accommodates both a wired access and a wireless access according to an exemplary embodiment of the present invention;

FIGS. 12 A and B illustrates a call setup attempt (1) from the wireline network to the wireless network when an FMCF acts as an application server according to an exemplary embodiment of the present invention;

FIG. 13 illustrates service IDs according to an exemplary embodiment of the present invention;

FIGS. 14 A and B illustrates a call setup attempt (2) from the wireline network to the wireless network when the FMCF acts as the application server according to an exemplary embodiment of the present invention;

FIG. 15 illustrates a network apparatus according to an exemplary embodiment of the present invention; and FIG. 16 illustrates a terminal according to an exemplary embodiment of the present invention.

BEST MODE FOR CARRYING OUT THE INVENTION

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for interworking between a wireless network and a wireline network.

FIG. 4 illustrates an interworking structure between wireline and wireless IMS networks according to an exemplary embodiment of the present invention.

Referring to FIG. 4, the IMS networks include S-Call State Control Functions (S-CSCFs) 435 and 445, Home Subscriber Servers (HSSs) 425 and 455 for providing subscriber information, Proxy (P)-CSCFs 430 and 450 disposed at a contact point to the subscriber, policy servers 420 and 460 for generating and sending policy decision information to IP edges 415 and 465, and the IP edges 415 and 465 for managing resources based on the policy decision information.

An FMC function part which is an interworking apparatus for recognizing difference of networks and supporting their interworking is interposed between the wireline network and the wireless network. Other entities not concerned within the IMS networks are not illustrated in the drawing.

The S-CSCFs 435 and 445, upon receiving an initial INVITE request, forward the corresponding message to the S-CSCFs 435 and 455 of a receiving subscriber or to a corresponding serving system.

The HSSs 425 and 455 contain the subscriber information. In a subscriber registration, the HSSs 425 and 455 provide the subscriber information to the S-CSCFs 435 and 455.

By interworking with the policy servers 420 and 460, the P-CSCFs 430 and 450 allocate and permit bearer resources and manage QoS. The P-CSCFs 430 and 450 forward the bearer resource request received from a terminal using the INVITE request and the bearer network information of the correspondent network, to the policy servers 420 and 460 so that the policy servers 420 and 460 can appropriately allocate the bearer resource and apply the demanded QoS.

Between the P-CSCFs 430 and 450 and the IP edges 415 and 465, the policy servers 420 and 460 provide functions of allocating and permitting the bearer resources and managing the QoS.

The PCRF provides the corresponding function in the 3GPP network and the SPDF provides the function of the policy server in the TISPAN network. While the functions of the policy server defined by the 3GPP standard and the TISPAN standard are different to some degree, the policy server receives the request from the P-CSCFs 430 and 450 and reserves and permits the resource.

The IP edges 415 and 465 represent nodes where IP communications is substantially carried out in the wireline and wireless networks. Under the control of the policy servers 420 and 460, the IP edges 415 and 465 allocate the bearer resources and establish a path for the bearer. GGSN corresponds to the wireless network IP edge, and BRAS corresponds to the wireline network IP edge.

The IMS terminal travels in each network and originates mutual communications. Currently, operations for using the IMS service in the wireline network and operations for using the IMS service in the wireless network are separately defined.

An Interconnection Border Control Function (IBCF) 440 is interposed between the networks and provides functions for signaling control, interworking between different IP intervals, and topology hiding.

A Fixed Mobile Convergence Function (FMCF), which is interposed between the wireline network and the wireless network, recognizes the difference of the networks and provides an interworking function to support the mutual interworking. According to the functional position of the FMCF, the FMCF may be included to the IBCF 440 which is the IMS standard function, or exist as an independent entity outside the IBCF 440. Alternatively, the FMCF may exist in the form of an Application Server (AS). In FIG. 4, the FMCF is included to the IBCF.

For the communication between the wireline and wireless IMS networks, an entity between the wireline network and the wireless network is required to recognize the difference of the two networks and to mediate between the networks. To this end, a functional entity, Fixed Mobile Convergence Function (FMCF), is defined.

In the communication between the different networks including the wireline and wireless networks, the FMCF provides the originating terminal with a function allowing the originating terminal to consider the receiving network terminal as a terminal in the same network as the originating network terminal.

In the IMS environment, since the IMS core network can accommodate various access networks, the FMCF should be able to check whether the access network used by the originating terminal is wired or wireless. Services can be smoothly provided only after checking whether the network used by the receiving terminal is wired or wireless.

With respect to the receiving terminal, it is infeasible to check whether the receiving network is wired or wireless merely using a Session Initiation Protocol (SIP) URI contained in the INVITE request. Thus, the FMCF checks whether the corresponding network is a different network or not using the response from the receiving network.

When determining the different network, the FMCF provides the function for supporting the smooth call setup between the wired/wireless networks.

The present invention provides the methods when the FMCF lies in the IBCF, when the FMCF is an independent network entity, or when the FMCF is an independent application server. In those methods, the position of the FMCF and the access network checking process differ and the subsequent call setup process is the same.

The access network checking processes of the FMCF in the IBCF and the independent FMCF are described below.

In general, when the functions such as topology hiding and IP version conversion are not required, the INVITE request is transmitted to the different network by skipping the IBCF. Thus, according to the present method; that is, to provide the FMCF function by the IBCF, every call should be transferred to the different network via the IBCF according to the network policy.

As for the independent FMCF, the logical position of the FMCF is restricted to between the S-CSCF and the IBCF, to hops before the IBCF, or to hops after the IBCF. While the relevant function execution (the final delivery location of the access network information) may partially change, the overall interworking operation does not change.

Since the access network in the IMS can be wired or wireless variously, the FMCF checks for the access network used by the originating terminal, confirms the response transferred from the receiving network, and then determines whether to provide the wired/wireless interworking function.

When the both networks are the same network, the FMCF can merely act as a relay station or make subsequent SIP messages not pass through the FMCF by deleting its address information from a record-route.

To provide the wired/wireless interworking function, the FMCF primarily checks whether the originating network is wired or wireless by examining the option tag of the INVITE request.

When the option tag includes the precondition item, it can be regarded that the originating terminal is using the wireless network. In case where the originating terminal is a wireless terminal in the non-precondition mode or a wireline terminal, there is no option tag including the related information. Thus, the FMCF confirms the access network information additionally included in the INVITE request transmitted from the originating terminal.

The present-day standard includes P-Access-Network-Info header as the optional header in the INVITE request and provides the access network information to the core network. The S-CSCF deletes this information so as to block the corresponding information from being leaked to other networks.

According to the present invention, since every call is transferred to other networks via the IBCF, the S-CSCF does not delete the P-Access-Network Info so that the IBCF can acquire the access network information. Because the FMCF deletes the confirmed access network information header and forwards the message to the next hop, even when the FMCF is added, there is no difference from the existing operations.

To support the wired/wireless interworking, the originating terminal may include wired/wireless information (additional header separately from P-Access-Network-Info) of its network to the INVITE request and transmit the information.

By confirming the INVITE request, the FMCF can check whether the network of the originating terminal is wired or wireless. As sending the corresponding INVITE request to other networks, the FMCF deletes the network information of the originating terminal.

A call setup attempt process of the wireline terminal is now described according to the present invention.

FIGS. 5 A and B illustrates the call setup attempt from the wireline network to the wireless network according to an exemplary embodiment of the present invention.

When the call setup is attempted from the wireline network to the wireless network, the FMCF checks whether the correspondent network is wired or wireless using the response received from the correspondent.

The wireless terminal and the FMCF do not transmit the INVITE request while knowing that the receiving side is wired. Particularly, in view of the terminal, whether the correspondent is wired or wireless has nothing to do with the communication. The FMCF can recognize that the correspondent is a wireless terminal in the non-precondition mode, based on the 200 Ok response received from the receiving network.

Basically, the wireline terminal, upon receiving the INVITE request, transmits the 180 Ringing response, whereas the wireless terminal transmits 200 Ok or 183 Session Progress response according to its operating mode. Thus, the wireless terminal can determine whether the network of the correspondent is wired or wireless, using the response message received from the correspondent.

Referring to FIG. 5A, the FMCF 515, recognizing that the receiving side is a wireless terminal 520 operating in the non-precondition mode, generates and sends the 180 Ringing response to a wireline terminal 510 and sends Ack response and re-INVITE request to the wireless terminal 520. The second SDP is forwarded to the wireless terminal 520 so as to activate the bearer resource.

The FMCF 515, which receives the 200 Ok response from the wireless terminal 520 in reply to the response of the INVITE request, converts the 200 Ok response to the 180 Ringing response and forwards the converted response in order to prepare for error, to be explained in reference to FIGS. 6 A and B.

That is, the FMCF 515 supports both of the originating terminal 510 and the receiving terminal 520 to conduct the smooth call setup between the wireline/wireless terminals while sustaining their basic operating mode.

Referring to FIG. 5B, upon receiving the error response from the receiving terminal 535, the FMCF 530 recognizes that the receiving terminal 535 operates in the pre-condition mode. The FMCF 530 generates the INVITE request including the pre-condition option tag and sends the INVITE request to the receiving terminal 535 for the call setup procedure.

FIGS. 6 A and B illustrates a call setup attempt from the wireline network to the wireline network according to an exemplary embodiment of the present invention.

In the call setup between the wireline terminals, the FMCF does not execute any function in the normal situation but simply relays the request and the response message between the wireline terminals.

In FIG. 6A, when the 180 Ringing response of the receiving terminal 620 is lost and not transferred or delivered to the FMCF 615 later than the 200 Ok response, the FMCF 615 determines that the receiving terminal 620 is a wireless terminal and operates in the non-precondition mode, and performs the subsequent procedure.

In FIG. 6B, as the wireline terminal 630 does not send the 180 Ringing response for the re-INVITE request, the 180 Ringing response generated by the receiving terminal 640 cannot be not delivered to the originating terminal 630. Ultimately, the originating terminal 630 cannot inform the user of the signal transmission to the correspondent.

To address this shortcoming, the FMCF 635, which receives the 200 Ok response for the initial INVITE request, generates and sends the 180 Ringing response to the originating terminal 630.

Namely, the wireline terminal 640 is regarded as the wireless terminal of the pre-condition mode.

This applies to the call setup procedure with the wireless terminal of the non-precondition mode of FIGS. 5 A and B. To prevent the originating terminal from repeatedly receiving the 180 Ringing response in FIGS. 5 A and B, the FMCF discards the 180 Ringing response from the receiving wireless terminal.

FIG. 7 illustrates operations when an originating network and a receiving network are the same type networks according to an exemplary embodiment of the present invention.

FIG. 7 depicts the call setup procedure when and after the FMCF 715 determines the call setup between wireline terminals 710 and 720 and deletes its address from the record-route to make subsequent SIP messages skip the FMCF 715. The FMCF 715 deletes its address from the record-route.

Now, the call setup procedure of the wireless terminal is described.

FIGS. 8 A and B illustrates a call setup attempt from the wireless network to the wireline network according to an exemplary embodiment of the present invention.

In the call setup attempt from the wireless network to the wireline network, the FMCF checks whether the correspondent network is wired or wireless, based on the response from the correspondent.

The wireless terminal and the FMCF do not send the INVITE request while recognizing that the correspondent is the wireline terminal. Particularly, in view of the terminal, the wired/wireless correspondent has nothing to do with the communications.

In FIG. 8A, the FMCF 815 receiving the 180 Ringing response from the receiving terminal 820 recognizes that the receiving terminal 820 is a wireline terminal, and does not send the 180 Ringing response to the originating terminal 810.

Next, the FMCF 815 receives the 200 Ok response from the receiving terminal 820 and relays the response to the originating terminal 810. Upon receiving the re-INVITE request from the originating wireless terminal 810, the FMCF 815 generates and transmits the 180 Ringing response to the originating wireless terminal 810.

In FIG. 8B, when the originating wireless terminal operates in the precondition mode, the receiving wireline terminal 840 sends the error response in reply to the INVITE request (the option tag : including the precondition) received from the originating wireless terminal 830.

The FMCF 835 determines whether the respective networks are wired or wireless, using the option tag of the INVITE request and the response from the receiving terminal 840. Determining the originating terminal 830 is a wireless terminal of the precondition mode, the FMCF 835 generates and transmits the 183 Session Progress response to the originating terminal 830.

Next, the FMCF 835 automatically transmits the 200 OK responses for PRACK and UPDATE messages received from the originating terminal 830, generates and transmits the INVITE request not including the option tag to the receiving terminal 840, and performs the call setup procedure toward the wireline network.

FIGS. 9 A and B illustrates operations in a relay mode when the originating network and the receiving network are the same type networks according to an exemplary embodiment of the present invention.

In the call setup of FIGS. 9 A and B, the FMCF determines the call setup between the wireless terminals and operates in the relay mode. For doing so, the FMCF adds its address to the routing header of the INVITE request.

Referring to FIG. 9A, the FMCF 915 relays the signaling between the originating terminal 910 and the receiving terminal 920. Since the originating terminal 910 has no option tag, the FMCF 915 recognizes that the originating terminal 910 operates in the non-precondition mode. Based on the 200 OK response from the receiving terminal 920, the FMCF 915 recognizes that the correspondent 920 is the wireless terminal.

In FIG. 9B, the FMCF 935 relays the signaling between the originating terminal 930 and the receiving terminal 940. As the originating terminal 930 has the option tag, the FMCF 935 recognizes that the originating terminal 930 operates in the precondition mode. Based on the 183 Session Progress response from the receiving terminal 940, the FMCF 935 recognizes that the correspondent 940 is the wireless terminal.

FIGS. 10 A and B illustrates operations in a transparent mode when the originating network and the receiving network are the same type networks according to an exemplary embodiment of the present invention.

FIGS. 10 A and B depicts the call setup procedure when and after the FMCF determines the call setup between the wireless terminals and deletes its address from the record-route to make subsequent SIP messages skip the FMCF.

In FIG. 10A, the FMCF 1015 relays the signaling between the originating terminal 1010 and the receiving terminal 1020. Since the originating terminal 1010 has no option tag, the FMCF 1015 recognizes that the originating terminal 1010 operates in the non-precondition mode. Based on the 200 OK response from the receiving terminal 1020, the FMCF 1015 recognizes that the correspondent is the wireless terminal.

In FIG. 10B, the FMCF 1035 relays the signaling between the originating terminal 1030 and the receiving terminal 1040. Since the originating terminal 1030 has the option tag, the FMCF 1035 recognizes that the originating terminal 1030 operates in the precondition mode. Based on the 183 Session Progress response from the receiving terminal 1040, the FMCF 1035 recognizes that the correspondent is the wireless terminal of the precondition mode.

FIG. 11 illustrates a structure when the IMS network accommodates both the wired access and the wireless access according to an exemplary embodiment of the present invention.

In FIG. 11, the IMS network 1100 is independent of the access networks 1110 and 1120 and thus is able to accommodate any type of the access network.

When the single IMS network 1110 accommodates the plurality of the access networks 1110 and 1120 and the access networks are divided into the wired/wireless networks, the call setup attempt may generate between the wired/wireless access networks 1110 and 1120 via the same IMS core network 1100.

When the IMS network 1100 accommodates the wired access network 1110 and the wireless access network 1120 at the same time, the call setup message passes through the FMCF 1102 according to the additional operation of the I-CSCF and the call setup is performed between the wired/wireless terminals.

Upon receiving the INVITE request, the I-CSCF determines a node to which the INVITE is forwarded through the request to the HSS. When receiving the address of the same domain from the HSS, the I-CSCF adds the IBCF (when the FMCF belongs to the IBCF) to the routing header and transmits the corresponding data to the IBCF. The subsequent procedure is carried out by the FMCF and the call setup between the wired/wireless terminals proceeds.

Now, a case where the FMCF is the application server is illustrated.

The FMCF acting as the application server operates differently from the FMCF belonging to the IBCF.

When the FMCF belongs to the IBCF, the FMCF determines the receiving network is different. By contrast, when the FMCF is the independent application server, the originating terminal determines whether the network is different or not. Naturally, the procedures defined in the respective methods are different from each other.

For instance, in FIGS. 2 and 3, the terminal receiving the error response recognizes the necessity of the interworking function of the FMCF and transmits the INVITE request by indicating the necessary FMCF function. Next, the S-CSCF confirms this and requests the service to the FMCF acting as the application server, to thus proceed the wired/wireless network interworking.

The FMCF acting as the application server can provide the wired/wireless network interworking service by confirming the information relating to the network of the originating terminal.

For doing so, since P-Access-Network-Info contained in the INVITE request is forwarded to the application server in order to provide the location based service, the FMCF can acquire the information relating to the network of the originating terminal without particular modification.

Prior to the INVITE request, it may be necessary to exchange a Cancel response with the correspondent. In this situation, the type of the SIP response message transmitted by the receiving terminal varies depending on the INVITE request transmitted by the originating terminal. When receiving the 180 Ringing or 200 Ok response rather than the error response, the originating terminal terminates the current call setup by sending the Cancel request and generates a new INVITE request.

Now, the call setup attempt procedure (1) of the wireline terminal in the case where the FMCF is the application server is described.

FIGS. 12 A and B illustrates the call setup attempt procedure (1) from the wireline network to the wireless network when the FMCF is the application server according to an exemplary embodiment of the present invention.

FIG. 12A shows that the receiving wireless terminal 1220 operates in the pre-condition mode and FIG. 12B shows that the receiving wireless terminal 1245 operates in the non-precondition mode.

When the FMCFs 1215 and 1240 are the application servers, the initial INVITE request and its corresponding response do not pass through the FMCFs 1215 and 1240.

The originating wireline terminal 1205 and 1230 confirm the response of the INVITE request and check whether the correspondent is wired or wireless. Next, determining that the interworking using the FMCFs 1215 and 1240 is necessary, the originating wireline terminals 1205 and 1230 request the S-CSCFs 1210 and 1235 to activate the FMCF interworking function.

For doing so, it is necessary that the terminal determines whether the correspondent network is wired or wireless using the response provided from the correspondent, and re-transmits the INVITE request by including an indicator indicative of the necessary FMCF function or a service ID.

The S-CSCFs 1210 and 1235 needs to request the service to the FMCF by confirming the request. To this end, the HSS should include a service trigger function.

When the indicator is used, the originating terminal has to forward the INVITE request by including not only the FMCF function trigger but also the information relating to the response message for the INVITE request so that the FMCF can determine whether the receiving network is wired or wireless.

More simply, the service ID contains the FMCF function trigger and the information relating to the response received from the receiving terminal.

In FIG. 12B, upon receiving the 200 Ok response from the receiving terminal 1245, the originating terminal 1230 determines that the receiving terminal 1245 is a wireless terminal in the non-precondition mode, and sends the new INVITE request by including the service ID "+g.ims.icsi.FMCF_srv_1" among the service IDs of FIG. 13.

Next, the S-CSCF 1235 acquires that the INVITE request received from the originating terminal 1230 includes the FMCF trigger, checks whether the HSS includes the service trigger function, and transfers the INVITE request to the FMCF 1240.

The FMCF 1240 receiving the request checks whether the both different networks are wired or wireless and performs the procedures as requested by the respective networks, thus supporting the smooth call setup between the wired/wireless terminals.

The FMCF 1240 determines whether the access network is wired or wireless based on the P-Access-Network-Info header of the INVITE request, and sends the error response (406 Not Acceptable) when the two networks are the same.

FIG. 13 illustrates the service IDs according to an exemplary embodiment of the present invention.

FIG. 13 shows the service IDs for the responses respectively.

As mentioned earlier, the trigger "+g.ims.icsi.FMCF_srv_1" indicates the 200 Ok and the correspondent wireless network of the non-precondition mode.

The trigger "+g.ims.icsi.FMCF_srv_2" indicates the 183 Session Progress and the correspondent wireless network of the precondition mode.

The trigger "+g.ims.icsi.FMCF_srv_3" indicates the 180 Ringing and the correspondent wireline network.

The trigger "+g.ims.icsi.FMCF_srv_4" indicates the error (420 Response) and the correspondent wireline network or the correspondent wireless network of the non-precondition mode.

The trigger "+g.ims.icsi.FMCF_srv_5" indicates the error (421 Response) and the correspondent wireless network of the precondition mode.

Hereafter, the call setup attempt procedure (2) of the wireline terminal when the FMCF is the application server is explained.

FIGS. 14 A and B illustrates the call setup attempt (2) from the wireline network to the wireless network when the FMCF is the application server according to an exemplary embodiment of the present invention.

In FIG. 14A, when the INVITE request from the wireless terminal 1410 of the pre-condition mode is received at the receiving wireline terminal 1425 or the receiving wireless terminal of the non-precondition mode, the receiving wireline terminal 1425 or the receiving wireless terminal of the non-precondition mode send the error response (420 Bad Extension).

Based on the 420 Bad Extension, the originating terminal 1410 can infer that the correspondent 1425 is the wireline terminal or the wireless terminal of the non-precondition mode.

Since the originating terminal 1410 cannot acquire additional information, it regards the correspondent as the wireline terminal. Even when the correspondent is the wireless terminal of the non-precondition mode, the call setup is feasible.

In FIG. 14B, when the INVITE request from the wireless terminal 1430 of the non-precondition mode is received at the receiving wireline terminal 1445, the receiving wireline terminal 1445 sends the 180 Ringing.

Next, the originating terminal 1430 recognizes the correspondent 1445 as the wireline terminal and performs the subsequent operations.

FIG. 15 is a block diagram of a network apparatus according to an exemplary embodiment of the present invention. Herein, the network apparatus represents the FMCF.

The apparatus of FIG. 15 includes a communication interface 1510, a controller 1520, a storage 1530, and a wired/wireless interworker 1540.

The communication interface 1510, which is a module for communicating with other nodes, includes a wireline processor and a baseband processor. The wireline processor converts a signal received in the wired path to a baseband signal and provides the baseband signal to the baseband processor. The wireline processor converts a baseband signal output from the baseband processor to a wireline signal transmittable in the wired path and transmits the signal in the wired path.

The controller 1520 controls the overall operation of the apparatus. Particularly, the controller 1520 controls the wired/wireless interworker 1540.

The storage 1530 stores a program for controlling the operations of the apparatus and data temporarily generating in the program execution.

The wire/wireless interworker 1540 provides the interworking function for the wireline and wireless terminals as mentioned earlier.

As constructed above, the controller 1520 can function as the wired/wireless interworker 1540. Here, the controller 1520 and the wired/wireless interworker 1540 are separately provided to distinguish their functions.

In the actual implementation, the controller 1520 may process all or part of the functions of the wired/wireless interworker 1540.

FIG. 16 is a block diagram of a terminal according to an exemplary embodiment of the present invention, when the FMCF is the separate application server.

The apparatus of FIG. 16 includes a communication interface 1610, a controller 1620, a storage 1630, and a wired/wireless interworker 1640.

The communication interface 1610, which is a module for communicating with other nodes, includes a wireless processor and a baseband processor. The wireless processor converts a signal received in the wireless path to a baseband signal and provides the baseband signal to the baseband processor. The wireless processor converts a baseband signal output from the baseband processor to a wireless signal transmittable over the air and transmits the signal in the wireless path.

The controller 1620 controls the overall operation of the apparatus. Particularly, the controller 1620 controls the wired/wireless interworker 1640.

The storage 1630 stores a program for controlling the operations of the apparatus and data temporarily generating in the program execution.

The wire/wireless interworker 1640 provides the interworking function for the wireline and wireless terminals as mentioned earlier.

As constructed above, the controller 1620 can function as the wired/wireless interworker 1640. Here, the controller 1620 and the wired/wireless interworker 1640 are separately provided to distinguish their functions.

In the actual implementation, the controller 1620 may process all or part of the function of the wired/wireless interworker 1640.

Advantageously, when the IMS terminal attempts the call, the present invention can complete the resource allocation prior to the call setup against the signaling mismatch, regardless of whether the receiving network is wired or wireless.

The aforementioned FMCF or the FMCF being the application server is referred to as a junction node.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A call setup method of a network apparatus in an interne protocol (IP) multimedia subsystem (IMS) network, the method comprising:
   transmitting, to a second terminal, a first session initiation protocol (SIP) message received from a first terminal;
   receiving, from the second terminal, a second SIP message being generated according to a type of the first SIP message and a connection type of the second terminal;

determining whether a type of the second SIP message is supported by the first terminal, according to a connection type of the first terminal and the type of the first SIP message;

transmitting, to the first terminal, the second SIP message, if it is determined that the type of the second SIP message is supported by the first terminal; and transmitting, to the first terminal, a third SIP message having a type that is determined according to the type of the first SIP message and the connection type of the first terminal, if it is determined that the type of the second SIP message is not supported by the first terminal, wherein the connection type is one of a wireless connection and a wired connection to the IMS network, wherein SIP messages comprise the first SIP message, the second SIP message, and the third SIP message, wherein each type of the SIP messages is one of an SIP INVITE message, a 200 ok response, a 180 ringing response, a 183 session progress, a re-invite, and an acknowledge (ACK), and wherein the type of the second SIP message is different from the type of the third SIP message.

2. The call setup method of claim 1, further comprising: deleting the network apparatus from a message record route between the first terminal and the second terminal when the connection type of the first terminal is identical to the connection type of the second terminal.

3. The call setup method of claim 1, wherein the wireless connection is either in a precondition mode or a non-precondition mode, wherein the precondition mode is for allocating resources for communications prior to a call setup by transmitting an INVITE request once, and wherein the non-precondition mode is for allocating resources for communications by transmitting the INVITE message twice.

4. A network apparatus for conducting a call setup in an internet protocol (IP) multimedia subsystem (IMS) network, the apparatus comprising:

a transceiver; and at least one processor, operatively connected to the transceiver and configured to:

transmit, to a second terminal, a first session initiation protocol (SIP) message received from a first terminal;

receive, from the second terminal, a second SIP message being generated according to a type of the first SIP message and a connection type of the second terminal;

determine whether a type of the second SIP message is supported by the first terminal, according to a connection type of the first terminal and the type of the first SIP message;

transmit, to the first terminal, the second SIP message, if it is determined that the type of the second SIP message is supported by the first terminal; and transmit, to the first terminal, a third type SIP message having a type that is determined according to the type of the first SIP message and the connection type of the first terminal, if it is determined that the type of the second SIP message is not supported by the first terminal, wherein the connection type is one of a wireless connection and a wired connection to the IMS network, wherein SIP messages comprise the first SIP message, the second SIP message, and the third SIP message, wherein each type of the SIP messages is one of an SIP INVITE message, a 200 ok response, a 180 ringing response, a 183 session progress, a re-invite, and an acknowledge (ACK), and wherein the type of the second SIP message is different from the type of the third SIP message.

5. The network apparatus of claim 4, wherein the at least one processor is further configured to delete the network apparatus from a message record route between the first terminal and the second terminal when the connection type of the first terminal is identical to the connection type of the second terminal.

6. The network apparatus of claim 4, wherein the wireless connection is either in a precondition mode or a non-precondition mode, wherein the precondition mode is for allocating resources for communications prior to a call setup by transmitting an INVITE request once, and wherein the non-precondition mode is for allocating resources for communications by transmitting the INVITE message twice.

7. The call setup method of claim 3, wherein the connection type of the first terminal is identified based on information included in a call setup request message that is transmitted from the first terminal, and wherein the connection type of the second terminal is identified based on information included in a response message that is transmitted from the second terminal.

8. The call setup method of claim 7, further comprising: receiving, from the first terminal, the SIP INVITE message comprising information for an option tag representing the connection type of the first terminal.

9. The call setup method of claim 8, further comprising: identifying the connection type of the first terminal as the wireless connection if the option tag is included in the SIP INVITE message; and identifying the connection type of the first terminal as the wired connection if the option tag is not included in the SIP INVITE message.

10. The call setup method of claim 9, wherein the SIP INVITE message further comprises information for an access network, and wherein the method further comprises identifying the connection type of the first terminal by using the information of the access network.

11. The call setup method of claim 10, further comprising: determining a type of the second SIP message which is expected to be received in response to the transmitted first SIP message;

performing a transformation of the type of the second SIP message into the determined type, if the determined type is not equal to the type of the second SIP message.

12. The network apparatus of claim 6, wherein the connection type of the first terminal is identified based on information included in a call setup request message that is transmitted from the first terminal, and wherein the connection type of the second terminal is identified based on information included in a response message that is transmitted from the second terminal.

13. The network apparatus of claim 12, wherein the at least one processor is further configured to receive, from the first terminal, the SIP INVITE message comprising information for an option tag representing the connection type of the first terminal.

14. The network apparatus of claim 13, wherein the at least one processor is further configured to:

identify the connection type of the first terminal as the wireless connection if the option tag is included in the SIP INVITE message; and identify the connection type of the first terminal as the wired connection if the option tag is not included in the SIP INVITE message.

15. The network apparatus of claim 14, wherein the SIP INVITE message further comprises information for an access network, and wherein the at least one processor is further configured to identify the connection type of the first terminal by using the information of the access network.

16. The network apparatus of claim 15, wherein the at least one processor is further configured to:

determine a type of the second SIP message which is expected to be received in response to the transmitted first SIP message; and perform a transformation of the type of the second SIP message into the determined type if the determined type is not equal to the type of the second SIP message.

* * * * *